P. A. CUENOT.
ROLLER BEARING FOR TURN TABLES.
APPLICATION FILED MAR. 15, 1911.

1,079,911.

Patented Nov. 25, 1913.

2 SHEETS—SHEET 1.

Witnesses
Elizabeth Leckert
B. Sommers

Inventor
Paul A. Cuenot
By Henry Orth Jr.
Attorney

P. A. CUENOT.
ROLLER BEARING FOR TURN TABLES.
APPLICATION FILED MAR. 15, 1911.

1,079,911.

Patented Nov. 25, 1913.

2 SHEETS—SHEET 2.

Witnesses
Elizabeth Leckert
B. Sommers

Inventor
Paul A. Cuenot
By Henry Orth Jr.
Attorney

UNITED STATES PATENT OFFICE.

PAUL A. CUENOT, OF STEELTON, PENNSYLVANIA, ASSIGNOR TO THE PENNSYLVANIA STEEL COMPANY, OF PHILADELPHIA, PENNSYLVANIA, A CORPORATION.

ROLLER-BEARING FOR TURN-TABLES.

1,079,911. Specification of Letters Patent. Patented Nov. 25, 1913.

Application filed March 15, 1911. Serial No. 614,732.

*To all whom it may concern:*

Be it known that I, PAUL A. CUENOT, a citizen of the United States, residing at Steelton, in the county of Dauphin and State of Pennsylvania, United States of America, have invented certain new and useful Improvements in Roller-Bearings for Turn-Tables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to turn table centers and has for its object to provide such a center as will avoid undue wear on the thrust bearings and rollers of the center. In structures of this kind where heavy weights are sustained of 150 tons and upward by the center bearing, great difficulty has been experienced in preventing the wear of the rollers and more especially on those parts that take the lateral thrust of the coöperating parts. The increasing weights of locomotives and the weights of cars both loaded and unloaded to be turned have increased wear of these parts to exceptional degrees, resulting more especially in the "galling" of the metal parts taking up the end thrust of the conical rollers.

Figure 1:
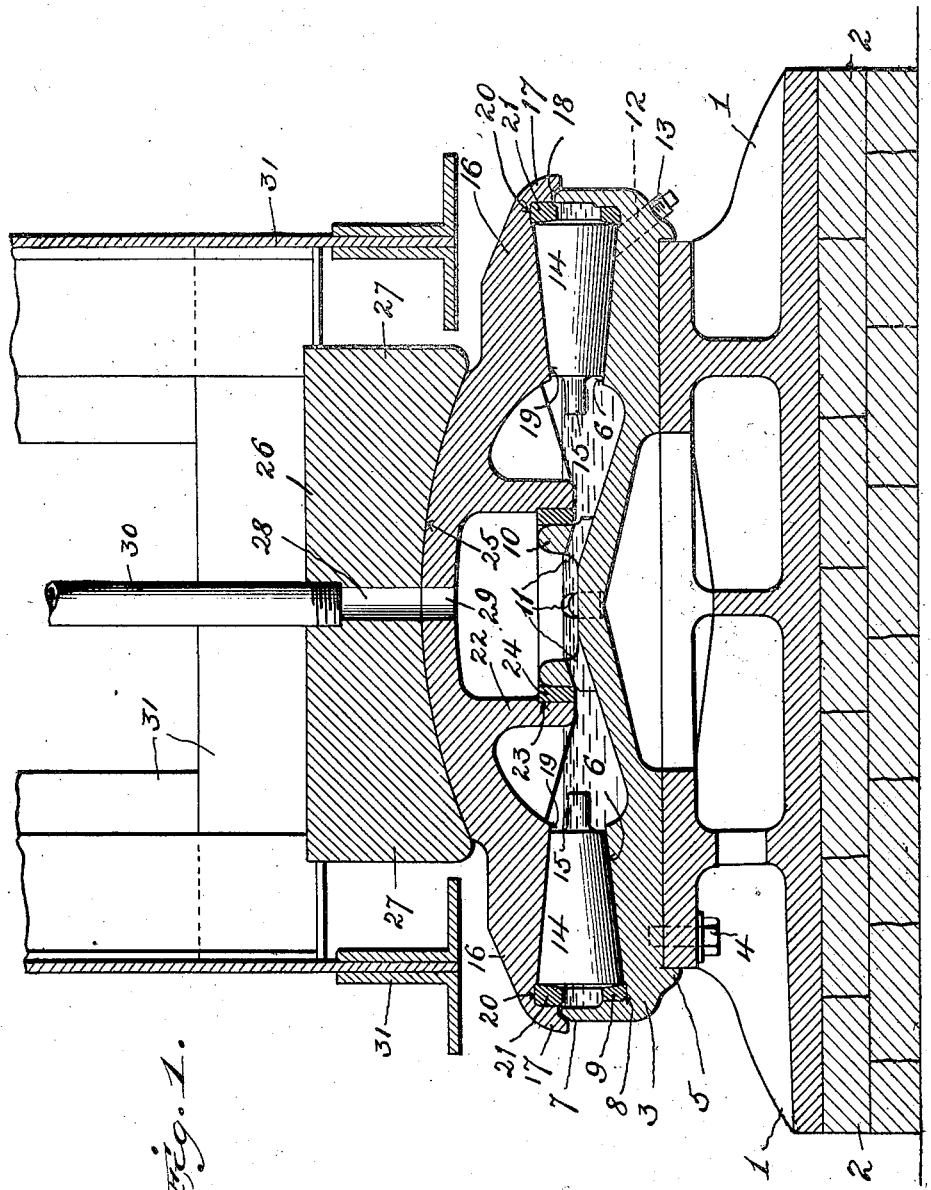
Figure 2:
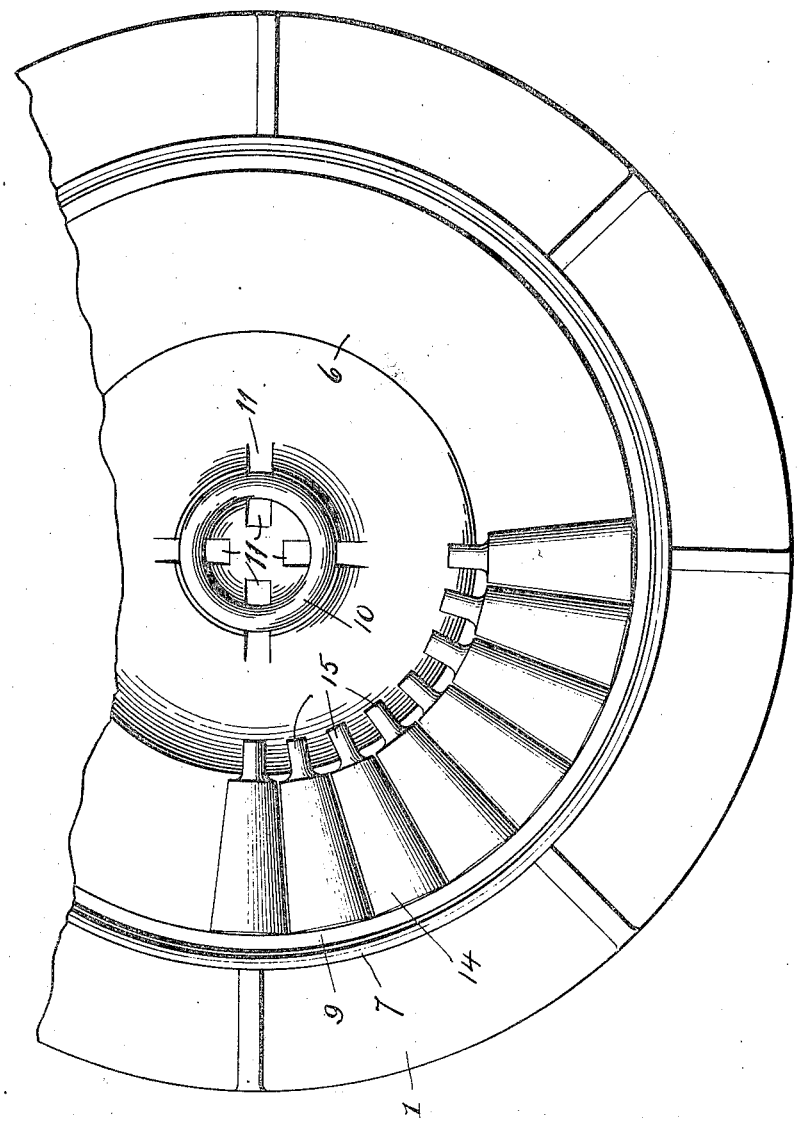

Referring to the drawings in which like parts are similarly designated, Figure 1 is a vertical, central section through the turn table center forming the subject matter of my invention, and Fig. 2 is a plan view of the lower roller box with some of the rollers in place.

The center comprises a base casting 1, resting directly on a masonry or other foundation 2 and secured thereto by any suitable means. On the base casting 2 is secured the lower roller box 3 of hardened steel. This roller box is secured to the base casting by bolts 4 at regular intervals around the periphery of the base casting or otherwise, as may be found expedient and has a depending peripheral flange 5 that fits over the annular upper part of the base casting. This roller box is provided with a conical face 6, forming the lower roller race way, and at the outer edge of this race and between it and an upwardly extending flange 7 is an annular groove 8 for the reception of a continuous thrust ring 9 of cast iron.

At the middle of the lower roller box 3 is an upwardly directed circular flange 10 forming a cup and provided with a number of oil passages 11, herein shown as four in number. At some point of the box, I provide a bore 12 closed by a threaded plug 13 for the purpose of draining out the oil when necessary, and preferably as shown in Fig. 1, tapping the face 6 adjacent ring 9.

On the bearing face 6, I place conical rollers 14 provided with handles 15 at their smaller, inner ends. These rollers are placed close to one another as shown more clearly in Fig. 2, as is customary in these structures. On top of the rollers, I place the upper roller box 16 provided at its periphery with a depending flange 17, provided with a rabbet 18, that extends over the upwardly extending flange 7 to form as nearly as may be a dirt proof joint. This upper roller box is also provided with a conical bearing face 19 opposite to and of the same conicity and diameter as the face 6 and which rests directly on the rollers. Between this face 19 and the flange 17, I form a circular groove 20 for the reception of a continuous cast iron thrust ring 21. The larger ends of the rollers 14 abut against the two thrust rings 9 and 21.

At the middle of the upper roller box, I form a depending circular flange 22 provided with a rabbet at 23 for the reception of a cast iron ring 24, said depending flange 22 and cast iron ring 24 being of sufficient size to surround the central cup or flange 10 with an easy fit.

The top of the upper roller box 16 is made spherical at 25 and on this portion, I place a saddle 26 of cast iron, which has a lower face 27 of the same radius as the spherical portion 25 of the upper roller box. This saddle has a central bore 28 that registers with a hole 29 in the upper roller box 16, and has threaded in its upper end an oil supply pipe 30 by means of which oil is supplied through bore 28, and hole 29 into the central cup 10 of the lower roller box, from which the oil is distributed through the holes 11 to the rollers, the level of the oil being maintained near the top of the flange 7.

On the saddle are placed a cross member comprising a built structural support 31 designed to carry the turn table proper. The two roller boxes are of cast steel while the rings 24, 21 and 9, which take the lateral thrust and are subjected to great wear, are continuous, which is a distinguishing feature of this invention and are made of close grained cast iron forced into their grooves or seats under heavy pressure.

I have found by long experience in the construction of turn tables and from attempts extending over many years to overcome the objectionable wear encountered in these structures on the thrust rings, that it is possible to make large diameter cast rings, and force them into their seats under pressure; and that this material will prolong the life of such a structure many times beyond that of similar structures known to me.

I claim:

A turn table center bearing comprising a lower roller box having a bearing face, a central flange provided with oil distributing passages, an upwardly directed peripheral flange and a groove formed between the face and flange; a continuous cast iron ring in swaged connection with the lower roller box and in said groove, an upper roller box having a bearing face, a central flange provided with a rabbet and taking over the central flange in the lower box, a peripheral flange having a rabbet taking over the peripheral flange of the lower box, a groove formed between the peripheral flange and bearing face of said upper box, a continuous cast iron ring in swaged connection with said upper box and in said groove, rollers between the bearing faces of said boxes, and means to supply oil through the top of the upper box within the central flange of the lower box.

In testimony that I claim the foregoing as my invention, I have signed my name in presence of two subscribing witnesses.

PAUL A. CUENOT.

Witnesses:
FRANK A. ROBBINS, Jr.,
ALBERT F. LEEDS.